Feb. 9, 1937.   J. F. LEVENTHAL   2,070,282
OPTICAL PROJECTION SYSTEM
Filed April 25, 1935
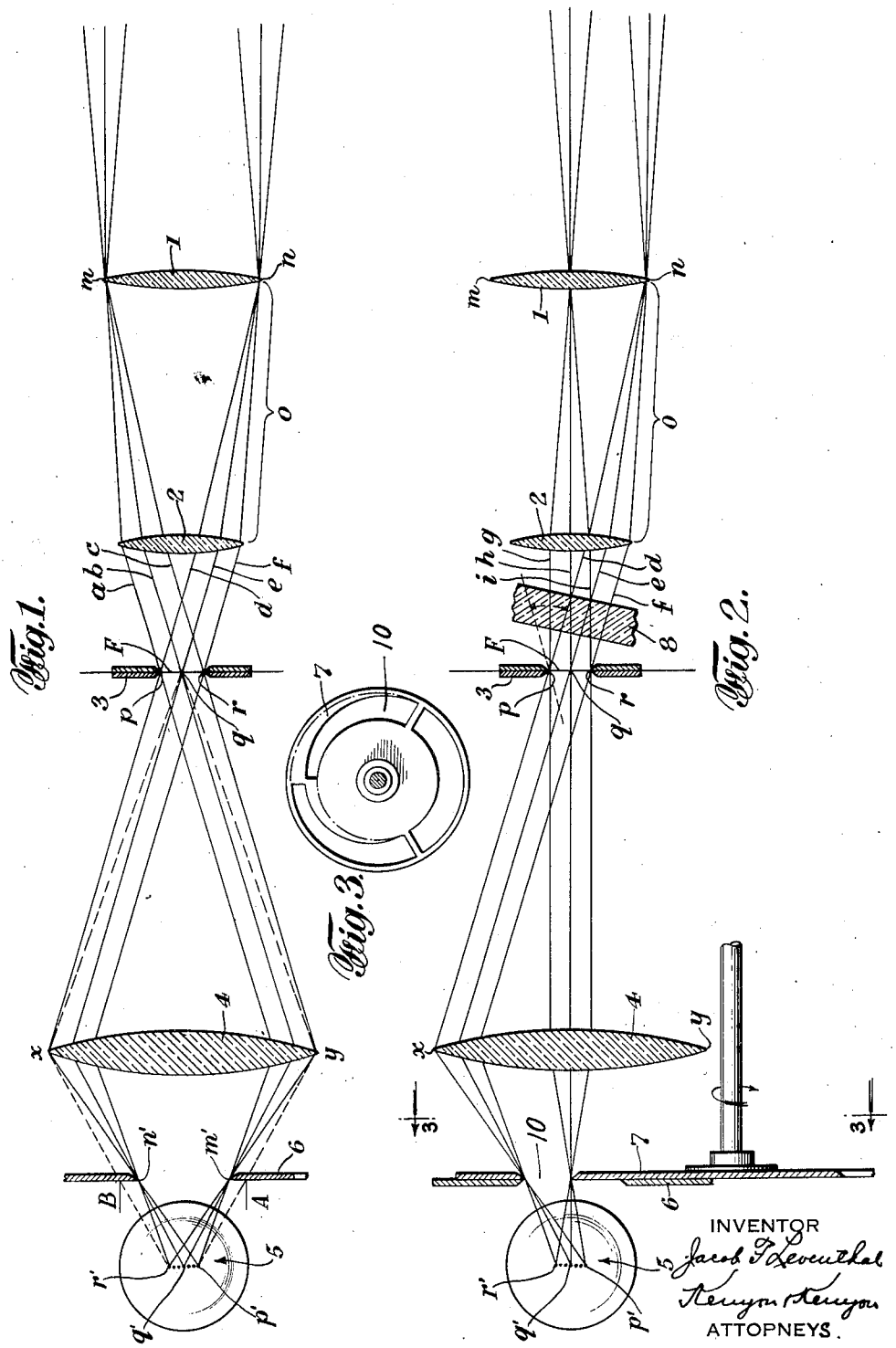
INVENTOR
Jacob F Leventhal
Kenyon & Kenyon
ATTORNEYS.

Patented Feb. 9, 1937

2,070,282

UNITED STATES PATENT OFFICE 2,070,282

OPTICAL PROJECTION SYSTEM

Jacob F. Leventhal, New York, N. Y., assignor to Leventhal Patents, Inc., New York, N. Y., a corporation of Delaware Application April 25, 1935, Serial No. 18,110

7 Claims. (Cl. 88—16.8)

This invention relates to optical projection systems.

A standard optical projection system consists of a projection aperture, a projection objective associated therewith, a light source, and a condenser lens for collecting light from the source and directing it to the objective. The object to be projected, for example, motion picture film, is arranged in the projection aperture and is illuminated by light passing from the condenser to the objective. Usually, the projection objective consists of a front and a rear lens suitably spaced, of which the front lens for all practical purposes may be considered the lens aperture. Only the light which passes through the front lens or lens aperture is used in forming an image of the object and where the projection aperture is small compared to the lens aperture, a considerable amount of light passes through the system which does not have any part in producing the screen image but merely results in undue heating of parts of the system.

An object of this invention is to exclude from the optical system the major portion of the non-image forming light.

According to this invention, there is interposed between the light source and condenser lens and in the principal focal plane of the condenser, a diaphragm having an aperture of proper size to pass only such light as will cooperate with the object and projection objective to produce an image of the object on a screen and to prevent all other light from passing to the condenser lens. In the optical system of a non-intermittent motion picture projector of the optical compensator type, means may be provided to vary the size and position of the diaphragm aperture to intercept light which, if not intercepted, would produce objectionable astigmatism near the beginning and ending of a compensation cycle.

Other objects, novel features and advantages of this invention will become apparent from the following specification and accompanying drawing, wherein:

Fig. 1 is a diagrammatic longitudinal section of the invention embodied in a stereopticon or intermittent motion picture projector;

Fig. 2 is a diagrammatic longitudinal section of the invention embodied in a non-intermittent motion picture projector of the optical compensator type; and Fig. 3 is a section on the line 3—3 of Fig. 2.

Referring now to Fig. 1, the projection objective O consists of a front lens 1 and a rear lens 2, the front lens 1 lying in substantially the principal focal plane of the rear lens 2. In the projection aperture 3 is located the picture film or plate F which is to be imaged on a screen.

The condenser 4 collects light from the source 5 and directs it through the aperture 3 to the objective O. A diaphragm 6 having a circular aperture is placed between the source 5 and condenser lens 4 in the principal focal plane of the condenser lens 4.

Because of the fact that lens 1 lies in the principal focal plane of lens 2, parallel rays such as the series $a$, $b$ and $c$ and the series $d$, $e$ and $f$ passing through the lenses 2 and 4 and the points $p$, $q$ and $r$ in the aperture 3, come to a focus in the plane of the points $m$ and $n$. Any other series of parallel rays passing through the lenses 2 and 4 and the points $p$, $q$ and $r$ in the aperture 3 will come to a focus at some point on the plane $m$ and $n$. Similarly, the series of parallel rays $a$, $b$, $c$ and the series of parallel rays $d$, $e$, $f$, if prolonged backward, will be brought to a focus by the condenser 4 at points in its principal focal plane $m'n'$ which is the plane of the diaphragm 6. There will thus be produced an image in the diaphragm plane of the lens 1. Thus the diametrically opposite points $m$ and $n$ on the periphery of the lens 1 will be imaged at $m'$ and $n'$ in the diaphragm plane and the lens image in the diaphragm plane will be the circular area having the distance $m'n'$ as its diameter. Hence, only those rays that pass from the source 5 through such circular area can emerge from the lens 1 as image-forming rays.

If the rays $a$ and $d$ which pass through the point $p$, are prolonged backward through the condenser 4, they will be brought to focus at the point $p'$. Similarly, the rays $b$ and $e$ which pass through the point $q$ will be brought to focus at the point $q'$ and the rays $c$ and $f$ which pass through the point $r$ will be brought to focus at the point $r'$. The plane of the points $p$, $q$ and $r$ is thus conjugate with the plane of the points $p'$, $q'$ and $r'$. The light source 5, in this case, a filament, consisting of a series of coils is located substantially in the plane $p'$, $q'$, $r'$.

The condenser 4 images the light source 5 at the film F and in combination with the lens 2 images the diaphragm 6 at the lens 1. The aperture in the diaphragm 6 is made with the distance $m'n'$ as its diameter and, therefore, excludes from the optical system all rays which would not pass through the objective O. The diaphragm thus intercepts rays such as $r'x$ and $p'y$ (shown in dotted lines) which would pass exterior of the periphery of the lens 2.

A reduction in the heat of the system is accomplished by reason of the fact that the diaphragm aperture is smaller than the area A, B in the plane of the diaphragm 6, defined by the limit rays such as $r'x$ and $p'y$. The amount of light and heat passing through the aperture in the diaphragm is proportional to the square of its diameter and if the diameter $m'n'$ is assumed to be .9", diameter A, B is assumed to be 1.4", the ratio is .81 to 1.96 or a reduction of about 50%. It is apparent that none of the excluded light could have reached the screen image and is, therefore, non-useful light.

The system herein disclosed in Fig. 2 is the same as the system disclosed in Fig. 1, except that a plane-parallel optical compensator 8 is interposed between the film F and objective O and the diaphragm consists of a stationary member 6 arranged in the principal focal plane of the condenser 4, and an adjacent rotary disk 7 having an annular aperture, the ends of which taper rather sharply, the ends also being offset radially from each other, such a disk being shown in detail in Jacob F. Leventhal Patent No. 2,004,120 of June 11, 1935. The aperture of member 6 and the aperture of disk 7 combine to form the diaphragm aperture.

Means (not herein shown, but similar to the means disclosed in said Leventhal application) are provided for feeding the film F at constant linear speed and, while the film is moved a predetermined distance, rotating the compensator 8 through a compensating cycle and effecting rotation of the disk 7 in timed relation therewith. The compensator 8 passes from the angular position shown through a position in which it is parallel to the film to a position of equal but opposite angular relation to that shown.

When the compensator is in the angular position shown, it is desirable that an upper part of the light pencils originating at $p, q, r$ on the film be prevented from reaching the screen image as otherwise objectionable astigmatism will be produced by rays making greater than a predetermined angle of incidence with the compensator face. This is accomplished by so arranging the cycle of the disk 7 that, when the compensator 8 is beginning its cycle, as shown, the disk will exclude from the light rays passing to the condenser 4 such light rays as will make greater than the predetermined angle of incidence with the compensator face resulting in the objectionable astigmatism. The point $p$, instead of being the point of origin of a full pencil of rays bounded by ray $a$, shown in dotted lines, and ray $d$, is now the point or origin of a reduced pencil of rays bounded by the rays $d$ and $g$. In a similar way, the points $q$ and $r$ are the points of origin of similarly reduced pencils.

At the end of the compensating cycle, the disk 7 will similarly exclude a lower part of the light pencils originating at $p, q$ and $r$, but at the middle of its cycle will pass all the light which can pass through the area $m'n'$ of the member 6.

Changes in the opening 10 in the disk 7 can be made to produce any desired speed of pencil below the maximum and any desired correction of the pencil in the direction of film feed. The compensator plate 8 is shown as having no effect on the rays. Actually, it has a displacing effect which, however, does not affect the parallelism of rays such as $d, e$ and $f$ and $g, h$ and $i$. Therefore, in order to keep the drawing as simple as possible, the displacing effect of the compensator has not been illustrated.

Ordinarily, the light source is an incandescent lamp having a filament consisting of a series of coils which constitute a very irregular light source. If such light source were directly reimaged at the screen plane, it would produce a non-uniformly illuminated image. However, in the non-intermittent type of projector, a stationary image is formed of that which moves in the projection aperture and a moving image is formed of that which is stationary at the aperture. Therefore, if the filament coils are disposed optically transverse to the direction of film travel, the stationary image thereof in the film plane is reimaged on the screen as a moving light source and thus the screen appears to be uniformly illuminated. It is with this type of apparatus that the present invention is primarily designed to function. Obviously, if the source is uniform, the invention is applicable without the vibration of the light source image.

Although not so shown, it is to be understood that the invention comprehends a variable aperture diaphragm to compensate for changes in the area $m'n'$ upon change of projection distances, with objectives of certain different types from that shown.

I claim:

1. An optical projection system comprising a condenser lens, a light source and a projection aperture lying substantially in conjugate planes of the condenser lens, an objective for receiving light from said source through said aperture and being composed of a rear lens and a front lens lying in substantially the front principal plane of the rear lens, and a diaphragm between said condenser and light source, said diaphragm lying in a principal plane of said condenser lens and having an opening of the same size and shape as the image of the objective front lens formed at the diaphragm plane by the combination of the objective rear lens and the condenser lens.

2. An optical projection system comprising a projection aperture, an objective composed of a rear and front lens spaced apart, a light source, a condenser lens for directing light from said source through said projection aperture to said objective, a diaphragm between said light source and said condenser lens, said condenser and rear lens being so positioned and having such focal length as to image the diaphragm in the plane of said front lens, means for feeding film across said projection aperture at uniform linear speed, a plane-parallel rotatable optical compensator between said projection aperture and said objective, means for rotating said compensator in timed relation with the film to produce a stationary virtual image of a film picture, and means for varying the diaphragm aperture in synchronism with the rotation of said compensator for intercepting, in the direction of compensation, the image-forming rays of the picture pencils making more than a predetermined angle of incidence with the compensator face and passing rays of the picture pencils making less than said predetermined angle of incidence.

3. An optical system according to claim 2 in which the front lens of the objective lies substantially in the principal focal plane of said rear lens, and said diaphragm lies in the principal focal plane of said condenser lens.

4. An optical system according to claim 2 in which the front lens of the objective lies substantially in the principal focal plane of said rear lens, said diaphragm lies in the principal focal plane of said condenser lens, and the maximum area of said diaphragm being such as to have its image substantially co-extensive with said front lens.

5. An optical projection system comprising a projection aperture, an objective composed of a rear and front lens spaced apart, a light source, a condenser lens for directing light from said source through said projection aperture to said objective, a diaphragm between said light source and said condenser lens, said condenser and rear lens being so positioned and having such focal length as to image the diaphragm in the plane of said front lens, means for feeding film across said projection aperture at uniform linear speed, a plane-parallel rotatable optical compensator between said projection aperture and said objective, means for rotating said compensator in timed relation with the film to produce a stationary virtual image of a film picture, a rotatable disk adjacent said diaphragm, and means to rotate said disk in timed relation with said compensator, said disk having an arcuate slot of less width at its ends than centrally and having its ends differently spaced from the disk axis and being arranged to register with the diaphragm aperture.

6. An optical projection system according to claim 5 in which the front lens of said objective lies substantially in the principal focal plane of the rear lens, and the diaphragm lies in the principal focal plane of said condenser lens.

7. An optical projection system according to claim 5 in which the front lens of said objective lies substantially in the principal focal plane of the rear lens, the diaphragm lies in the principal focal plane of said condenser lens, and the area of the diaphragm aperture being such that its image is substantially co-extensive with said front lens.

JACOB F. LEVENTHAL.